US012662142B2

(12) United States Patent     (10) Patent No.:   US 12,662,142 B2

Udate                 (45) Date of Patent:     Jun. 23, 2026

(54) CONTROL SYSTEM

(71) Applicant: TOYOTA JIDOSHA KABUSHIKI KAISHA, Toyota (JP)

(72) Inventor: Masateru Udate, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 18/753,559

(22) Filed: Jun. 25, 2024

(65) Prior Publication Data

US 2025/0002029 A1     Jan. 2, 2025

(30) Foreign Application Priority Data

Jun. 27, 2023    (JP) ................................ 2023-104691

(51) Int. Cl.
    *B60W 50/04*       (2006.01)
    *B60W 50/14*       (2020.01)
    *B60W 50/16*       (2020.01)

(52) U.S. Cl.
    CPC .......... *B60W 50/045* (2013.01); *B60W 50/16* (2013.01); *B60W 2050/143* (2013.01); *B60W 2050/146* (2013.01)

(58) Field of Classification Search
    CPC ............... B60W 50/045; B60W 50/16; B60W 2050/143; B60W 2050/146; B60W 50/14; B60W 2050/0002; B60W 50/00; B60W 60/001
    See application file for complete search history.

(56) References Cited

U.S. PATENT DOCUMENTS

| | | | |
|---|---|---|---|
| 2019/0071091 A1* | 3/2019 | Zhu ........................ | G08G 1/166 |
| 2019/0087736 A1 | 3/2019 | Kita | |
| 2020/0317220 A1 | 10/2020 | Kameda et al. | |
| 2023/0025721 A1 | 1/2023 | Mori et al. | |
| 2024/0160981 A1* | 5/2024 | Kordzanganeh ....... | G06N 3/045 |

FOREIGN PATENT DOCUMENTS

| | | |
|---|---|---|
| JP | 2018-181269 A | 11/2018 |
| JP | 2019-012255 A | 1/2019 |
| JP | 2019-056970 A | 4/2019 |
| WO | 2017/213064 A1 | 12/2017 |
| WO | 2021/111544 A1 | 6/2021 |

* cited by examiner

*Primary Examiner* — Brian A Zimmerman
*Assistant Examiner* — Cal J Eustaquio
(74) *Attorney, Agent, or Firm* — Dinsmore & Shohl LLP

(57) ABSTRACT

A control system installed in a vehicle comprises one or more processors. The one or more processors are configured to execute one or more control functions in response to a driving environment of the vehicle or a request. The one or more processors determines whether or not a machine learning model is used in a control function being executed. And when it is determined that the machine learning model is used, the one or more processors notify an operator of the vehicle that the control function using the machine learning model is being executed.

4 Claims, 6 Drawing Sheets

Contribution Degree
30%

Contribution Degree
70%

Contribution Degree
100%

CONTROL SYSTEM

CROSS-REFERENCE TO RELATED APPLICATION

The present disclosure claims priority to Japanese Patent Application No. 2023-104691, filed on Jun. 27, 2023, the contents of which application are incorporated herein by reference in their entirety.

TECHNICAL FIELD

The present disclosure relates to a control system installed in a vehicle.

BACKGROUND ART

In recent years, the use of machine learning models as artificial intelligence (AI) has been progressing in various fields. In addition, techniques for effectively utilizing AI have been considered in each field.

Patent Literature 1 discloses a processing apparatus comprising a user information acquisition unit that specifies a usage scene of AI by a user, and an AI selection unit that selects AI corresponding to the specified usage scene. In addition, the following Patent Literature 2 is a document showing the technical level of the present technical field.

LIST OF RELATED ART

Patent Literature 1: JP 2019056970 A
Patent Literature 2: JP 2019012255 A

SUMMARY

In the future, it is expected that machine learning models will be increasingly used in the field of vehicle control. It is considered that an operator of the vehicle uses a control function of the vehicle using a machine learning model under with a certain consent. On the other hand, various control functions are implemented in vehicle control, and it is considered that the usage situation of a machine learning model is different for each control function. For this reason, the operator of the vehicle may erroneously recognize whether or not a control function using a machine learning model is used. Such misunderstanding may cause an unexpected situation to the operator of the vehicle.

In view of the above problem, an object of the present disclosure is to provide a technique capable of reducing erroneous recognition by an operator of a vehicle as to whether or not a control function using a machine learning model is used.

One aspect of the present disclosure is directed to a control system installed in a vehicle.

The control system comprises one or more processors configured to execute one or more control functions in response to a driving environment of the vehicle or a request.

The one or more processors are further configured to execute:

a first process of determining whether or not a machine learning model is used in a control function being executed; and when it is determined that the machine learning model is used, a second process of notifying an operator of the vehicle that the control function using the machine learning model is being executed.

According to the present disclosure, it is determined whether or not a machine learning model is used in a control function being executed. Then, when it is determined that the machine learning model is used, an operator of a vehicle is notified that the control function using the machine learning model is being executed. It is thus possible to reduce erroneous recognition by the operator of the vehicle as to whether or not the control function using the machine learning model is used.

DETAILED DESCRIPTION

Hereinafter, embodiments will be described with reference to the drawings.

1. Automated Driving System

Figure 1:
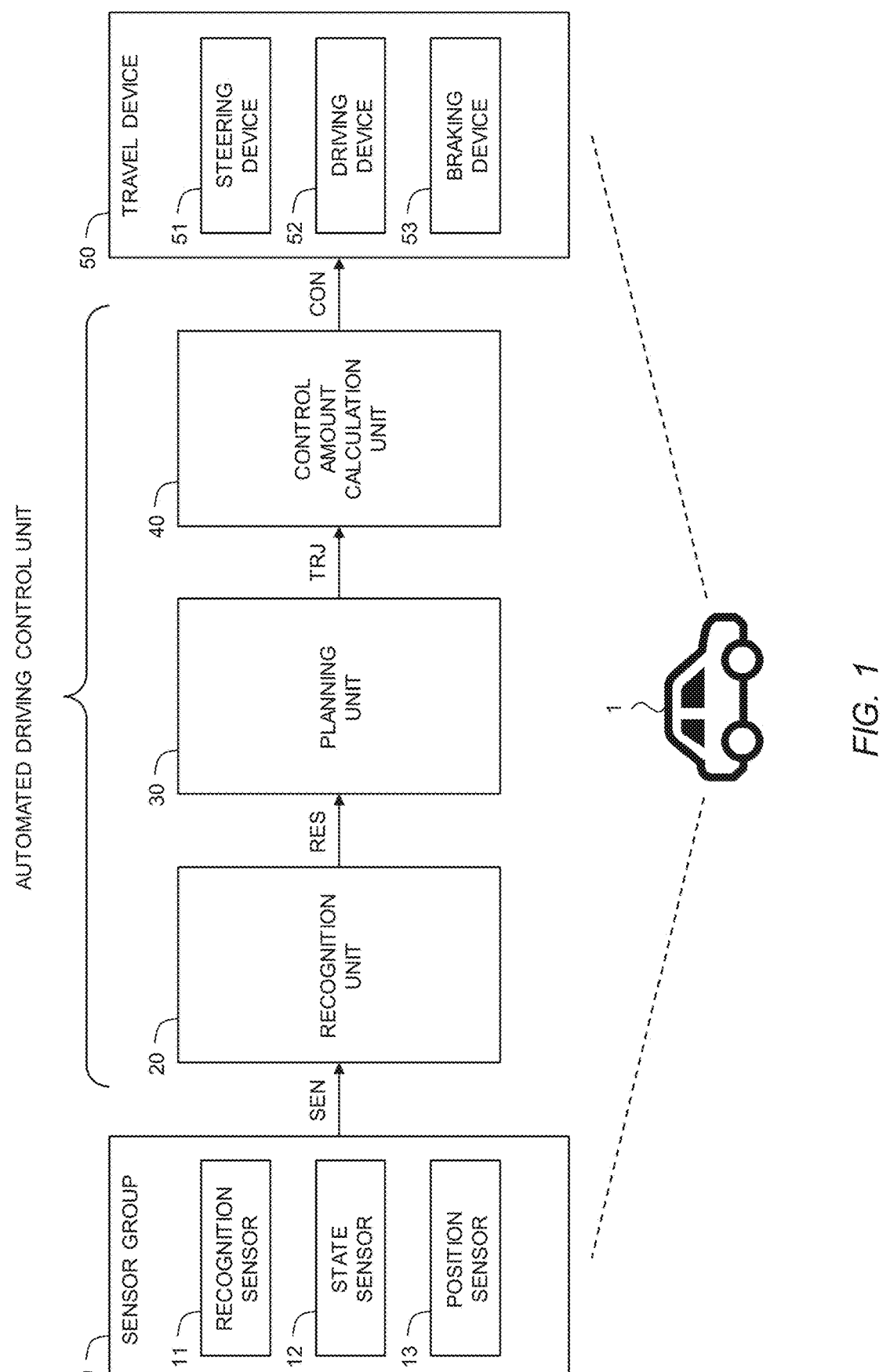
FIG. 1 is a diagram showing an example of a configuration related to an automated driving function of a vehicle according to the present embodiment.

The present embodiment relates to an automated driving system for a vehicle. The automated driving system according to the present embodiment is installed in the vehicle and executes an automated driving function in response to a driving environment of the vehicle or a request. FIG. 1 is a block diagram showing an example of a configuration related to an automated driving function of a vehicle 1 by an automated driving system according to the present embodiment. The automated driving is to automatically perform at least one of steering, acceleration, and deceleration of the vehicle 1 without depending on a driving operation performed by an operator. The automated driving function is a concept including not only complete automated driving control but also risk avoidance control, lane keep assist control, and the like. The operator may be a driver on board the vehicle 1 or may be a remote operator who remotely operates the vehicle 1.

The vehicle 1 includes a sensor group 10, a recognition unit 20, a planning unit 30, a control amount calculation unit 40, and a travel device 50.

The sensor group 10 includes a recognition sensor 11 used for recognizing a situation around the vehicle 1. Examples of the recognition sensor 11 include a camera, a laser imaging detection and ranging (LIDAR), a radar, and the like. The sensor group 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, a steering angle sensor, and the like. As the position sensor 13, a global navigation satellite system (GNSS) sensor is exemplified.

Sensor detection information SEN is information acquired by the use of the sensor group 10. For example, the sensor detection information SEN includes an image captured (taken) by the camera. As another example, the sensor detection information SEN may include point group information acquired by the LIDAR. The sensor detection information SEN may include vehicle state information indicating the state of the vehicle 1. The sensor detection information SEN may include position information indicating the position of the vehicle 1.

The recognition unit 20 receives the sensor detection information SEN. The recognition unit 20 recognizes a driving environment of the vehicle 1 based on the information acquired by the recognition sensor 11. For example, the recognition unit 20 recognizes an object around the vehicle 1. Examples of the object include a pedestrian, another vehicle (e.g., a preceding vehicle, a parked vehicle, and the like), a white line, a road structure (e.g., a guard rail, a curb, and the like), an alien object, a traffic light, an intersection, a sign, and the like. Also, for example, the recognition unit 20 performs localization of the vehicle 1. Recognition result information RES indicates a result of recognition by the recognition unit 20. For example, the recognition result information RES includes object information indicating a relative position and a relative speed of the object with respect to the vehicle 1.

The planning unit (planner) 30 receives the recognition result information RES from the recognition unit 20. In addition, the planning unit 30 may receive the vehicle state information, the position information, and map information generated in advance. The map information may be high-precision three-dimensional map information. The planning unit 30 generates a travel plan include maintaining a current travel lane, making a lane change, overtaking, making a right or left turn, steering, accelerating, decelerating, stopping, and the like. The planning unit 30 generates a target trajectory TRJ required for the vehicle 1 to travel in accordance with the travel plan. The target trajectory TRJ includes a target position and a target velocity. The travel plan and the target trajectory TRJ generated by the planning unit 30 are, so to speak, control decisions in the automated driving function.

The control amount calculation unit 40 receives the target trajectory TRJ from the planning unit 30. The control amount calculation unit 40 calculates a control amount CON required for the vehicle 1 to follow the target trajectory TRJ. It can be also said that the control amount CON is a control amount required for reducing a deviation of the vehicle 1 from the target trajectory TRJ. The control amount CON includes at least one of a steering control amount, a driving control amount, and a braking control amount. Examples of the steering control amount include a target steering angle, a target steering torque, a target motor angle, a target motor drive current, and the like. Examples of the driving control amount include a target speed, a target acceleration, and the like. Examples of the braking control amount include a target speed, a target deceleration, and the like.

The travel device 50 includes a steering device 51, a driving device 52, and a braking device 53. The steering device 51 steers wheels of the vehicle 1. For example, the steering device 51 includes an electric power steering (EPS) device. The driving device 52 is a power source that generates a driving force. Examples of the driving device 52 include an engine, an electric motor, an in-wheel motor, and the like. The braking device 53 generates a braking force. The travel device 50 receives the control amount CON from the control amount calculation unit 40. The travel device 50 operates the steering device 51, the driving device 52, and the braking device 53 in accordance with the steering control amount, the driving control amount, and the braking control amount, respectively. Thus, the vehicle 1 travels so as to follow the target trajectory TRJ.

The recognition unit 20 includes at least one of a rule-based model and a machine learning model. The rule-based model performs the recognition process based on a predetermined rule group. Examples of the machine learning model include a neural network (NN), a support vector machine (SVM), a regression model, a decision tree model, and the like. The NN may be a convolutional neural network (CNN), a recurrent neural network (RNN), or a combination of CNN and RNN. The type of each layer, the number of layers, and the number of nodes in the NN are arbitrary. The machine learning model is generated in advance through machine learning. The recognition unit 20 performs the recognition process by inputting the sensor detection information SEN into the model. The recognition result information RES is output from the model or generated based on the output from the model. The recognition unit 20 may be configured to perform a plurality of recognition processes using a plurality of models. For example, the recognition unit 20 may be configured to include a rule-based model for performing localization and a machine learning model for performing object recognition.

Similarly, the planning unit 30 also includes at least one of a rule-based model and a machine learning model. The planning unit 30 performs the planning process by inputting the recognition result information RES into the model. The target trajectory TRJ is output from the model or generated based on the output from the model. The planning unit 30 may be configured to perform the planning process using a plurality of models. For example, the planning unit 30 may be configured to include a machine learning model for generating a travel plan and a rule-based model for generating a target trajectory TRJ. Further, the planning unit 30 may be configured to be able to switch the model depending on the driving environment of the vehicle 1, a request, or the like. For example, the planning unit 30 may be configured to, in the generation of the travel plan, use the rule-based model while the vehicle 1 is traveling on an expressway and use the machine learning model while the vehicle 1 is traveling on a general road.

Similarly, the control amount calculation unit 40 also includes at least one of a rule-based model and a machine learning model. The control amount calculation unit 40 performs the control amount calculation process into the target trajectory TRJ into the model. The control amount CON is output from the model or generated based on the output from the model. The control amount calculation unit 40 may be configured to perform a plurality of control amount calculation processes using a plurality of models. For example, the control amount calculation unit 40 may be configured to include a machine learning model for calculating a steering control amount and a rule-based model for calculating a driving control amount and a braking control amount. Further, the control amount calculation unit 40 may be configured to be able to switch the model depending on the driving environment of the vehicle 1, a request, or the like.

Two or more of the recognition unit 20, the planning unit 30, and the control amount calculation unit 40 may have an integrated architecture. All of the recognition unit 20, the planning unit 30, and the control amount calculation unit 40 may have an integrated architecture (End-to-End architecture). For example, the recognition unit 20 and the planning unit 30 may have an integrated architecture that generates and outputs the target trajectory TRJ directly from the sensor detection information SEN. Even in the case of the integrated architecture, intermediate products such as the recognition result information RES and the target trajectory TRJ may be output. For example, in a case where the recognition unit 20 and the planning unit 30 have an integrated architecture based on a NN, the recognition result information RES may be an output from an intermediate layer of the NN.

The recognition unit 20, the planning unit 30, and the control amount calculation unit 40 constitute an "automated driving control unit" that executes the automated driving function of the vehicle 1.

Figure 2:
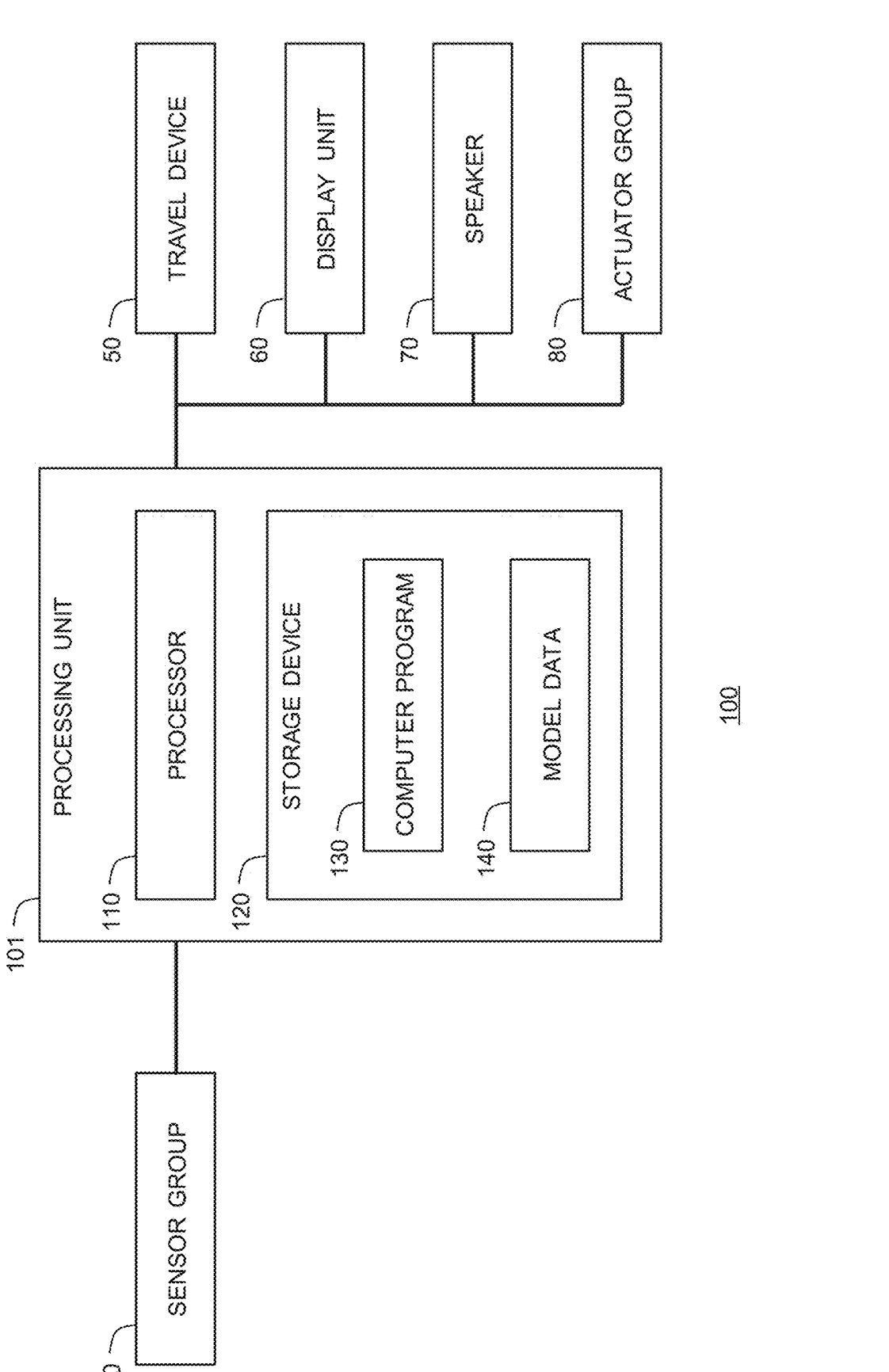
FIG. 2 is a diagram showing an example of a configuration of an automated driving system according to the present embodiment.

FIG. 2 is a block diagram showing an example of a hardware configuration of an automated driving system 100 according to the present embodiment. The automated driving system 100 has at least the function of the automated driving control unit described above.

The automated driving system 100 includes a processing unit 101, a sensor group 10, a travel device 50, a display unit 60, a speaker 70, and an actuator group 80. The processing unit 101 is configured to communicate with the sensor group 10, the travel device 50, the display unit 60, the speaker 70, and the actuator group 80.

The processing unit 101 is a computer that includes one or more processors 110 (hereinafter, simply referred to as a processor 110 or processing circuitry) and one or more storage devices 120 (hereinafter, simply referred to as a storage device 120).

The processor 110 executes a variety of processing. Examples of the processor 110 include a central processing unit (CPU), a graphics processing unit (GPU), an application specific integrated circuit (ASIC), a field-programmable gate array (FPGA), and the like. The recognition unit 20, the planning unit 30, and the control amount calculation unit 40 may be implemented by a single processor 110 or may be respectively implemented by separate processors 110. The storage device 120 stores a variety of information. Examples of the storage device 120 include a hard disk drive (HDD), a solid-state drive (SSD), a volatile memory, a non-volatile memory, and the likes.

The storage device 120 stores a computer program 130 and model data 140.

The computer program 130 is executed by the processor 110. The variety of processing by the automated driving system 100 may be implemented by a cooperation of the processor 110 executing the computer program 130 and the storage device 120. The computer program 130 may be recorded on a non-transitory computer-readable recording medium.

Model data 140 include data of the models included in the recognition unit 20, the planning unit 30, and the control amount calculation unit 40. The model data 140 are stored in the storage device 120. The processor 110 selects and uses a model from the model data 140 in execution of the automated driving function, thereby configuring the recognition unit 20, the planning unit 30, and the control amount calculation unit 40. In particular, the processor 110 may be configured to determine a model to be selected depending on the driving environment of the vehicle 1, a request, or the like. Thus, switching of the models included in the recognition unit 20, the planning unit 30, and the control amount calculation unit 40 is realized.

The display unit 60 is installed in the vehicle 1 and performs various displays. The display unit 60 is configured to be controllable by the processing unit 101. Examples of the display unit 60 include a meter panel display, a multi-information display, a head-up display, an indicator, and the like.

The speaker 70 is installed in the vehicle 1 and emits various sounds. The speaker 70 is configured to be controllable by the processing unit 101.

The actuator group 80 includes actuators of various devices included in the vehicle 1. For example, the actuator group 80 includes a vibration actuator for vibrating a steering wheel and a reaction torque actuator for generating a reaction torque on the steering wheel. The actuator group 80 is configured to be controllable by the processing unit 101.

2. Notification to Operator of Vehicle

In the automated driving system 100, the automated driving function executed by the processor 110 sometimes use a machine learning model, and sometimes use only a rule-based model. In addition, it is considered that the usage situation of the machine learning model in each of the recognition unit 20, the planning unit 30, and the control amount calculation unit 40 is different depending on the driving environment of the vehicle 1, a request, or the like.

In the automated driving system 100 according to the present embodiment, the processor 110 determines whether or not a machine learning model is used in the autonomous driven function being executed. Then, when it is determined that the machine learning model is used, the processor 110 notifies the operator of the vehicle 1 that the automated driving function using the machine learning model is being executed. These processes will be described below.

2-1. Determination of Whether Machine Learning Model is Used

The processor 110 can determine whether or not a machine learning model is used from the following viewpoints based on the respective configurations of the recognition unit 20, the planning unit 30, and the control amount calculation unit 40.

The first viewpoint is whether or not the output of the machine learning model is used as a control decision or a control amount. That is, according to this viewpoint, the processor 110 determines whether or not the machine learning model is used from the usage situation of the machine learning model in the planning unit 30 or the control amount calculation unit 40. For example, when the output of the machine learning model in the planning unit 30 is the travel plan or the target trajectory TRJ, the processor 110 determines that the machine learning model is used. Also, for example, when the output of the machine learning model in the control amount calculation unit 40 is the steering control amount, the driving control amount, or the braking control amount, the processor 110 determines that the machine learning model is used.

Figures 3A, 3B, 3C:
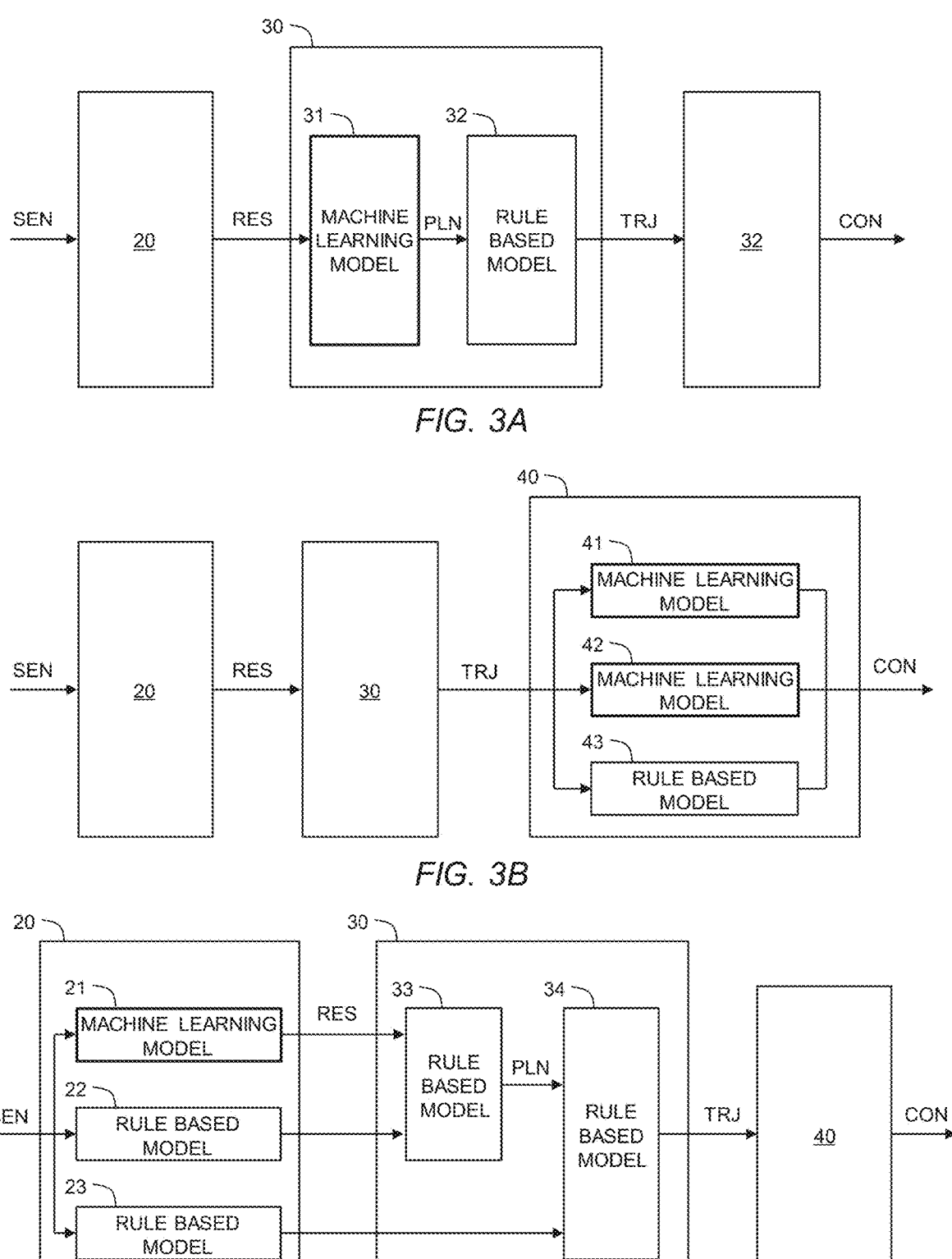
FIG. 3A is a diagram showing an example of a configuration of an automated driving control unit in which it is determined that a machine learning model is used.
FIG. 3B is a diagram showing another example of the configuration of the automated driving control unit in which it is determined that the machine learning model is used.
FIG. 3C is a diagram showing another example of the configuration of the automated driving control unit in which it is determined that the machine learning model is used.

FIGS. 3A and 3B each shown an example of a configuration of the automated driving control unit which is determined that the machine learning model is used based on the first viewpoint. In FIG. 3A, the planning unit 30 is configured by a machine learning model 31 and a rule based model 32. And the output of the machine learning model 31 is the travel plan PLN. In FIG. 3B, the control amount calculation unit 40 is configured by a machine learning model 41, a machine learning model 42, and a rule base model 43. The outputs of the machine learning model 41 and the machine learning model 42 are part of the control amount CON. For example, the machine learning model 41 is a model for calculating the steering control amount, and the machine learning model 42 is a model for calculating the driving control amount.

The second viewpoint is whether or not the control decision or the control amount is calculated using information of the driving environment of the vehicle 1 recognized by the machine learning model. That is, according to this viewpoint, the processor 110 determines whether or not the machine learning model is used from the usage situation of the recognition result information RES by the output of the machine learning model. For example, when the travel plan PLN or the target trajectory TRJ is generated by using object information output from the machine learning model in the planning unit 30, the processor 110 determines that the machine learning model is used.

FIG. 3C shows an example of the configuration of the automated driving control unit in which it is determined that the machine learning model is used from the second viewpoint. In FIG. 3C, the recognition unit 20 is configured by a machine learning model 21, a rule based model 22, and a rule based model 23. And in the planning unit 30, the rule based model 33 generates the travel plan PLN using the recognition result information RES output from the machine learning model 21.

As described above, according to the above viewpoints, the processor 110 can determine whether or not a machine learning model is used in the automated driving function being executed, from the respective configurations of the recognition unit 20, the planning unit 30, and the control amount calculation unit 40. The processor 110 may determine whether or not a machine learning model is used by combining each of the above described viewpoints.

2-2. Example of Notification

Figure 4:
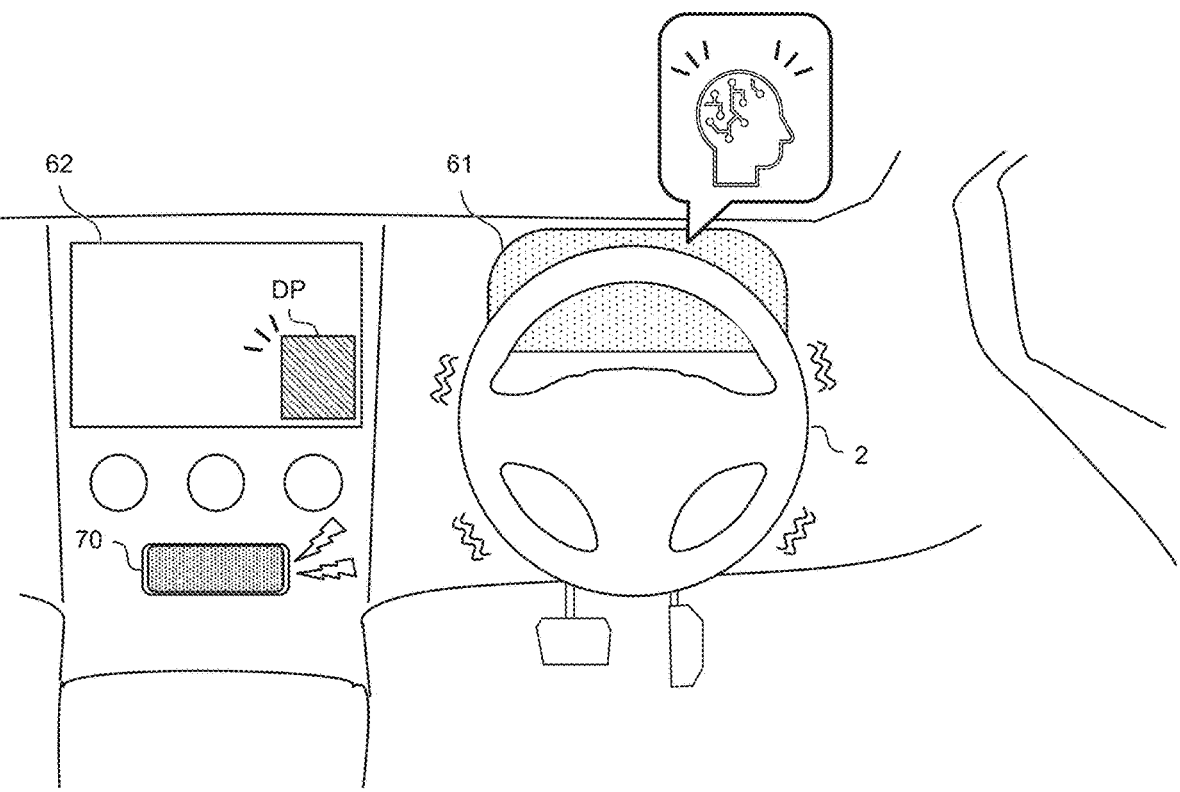
FIG. 4 is a diagram for explaining an example of notification according to the present embodiment.

Various modes can be adopted for the notification that the automated driving function using a machine learning model is being executed. FIG. 4 is a conceptual diagram for explaining an example of the notification. FIG. 4 shows the vicinity of the driver's seat of the vehicle 1. In FIG. 4, a meter panel display 61, a multi-information display 62, the speaker 70, and a steering wheel 2 are shown as devices provided around the driver's seat.

One example of the notification is to perform a specific display on the meter panel display 61. FIG. 4 shows an example in which a specific icon is displayed on the meter panel display 61.

Another example of the notification is to perform a specific display on the multi-information display 62. FIG. 4 shows an example in which a specific window DP is displayed on the multi-information display 62. The window DP is, for example, a display of a heat map showing the basis of the output of the machine learning model. Another example of the specific display in the multi-information display 62 is changing the color tone of the screen. Further, when the target trajectory TRJ is displayed on the multi-information display 62, the color and notation of the displayed target trajectory TRJ may be changed.

Another example of the notification is to emit a specific sound or voice from the speaker 70. For example, the speaker 70 outputs a voice such as "autonomous driving using AI will start".

Another example of the notification is to operate an actuator related to the steering wheel 2. FIG. 4 shows an example in which the steering wheel 2 is vibrated by a vibration actuator. In addition, it is also conceivable to change the weight of the operation of the steering wheel 2 by a reaction torque actuator.

By performing such notification, the operator in the driver's seat can easily recognize that the automated driving function using the machine learning model is being executed. The processor 110 may combine a plurality of notifications. The processor 110 may also be configured to notify the passengers of the vehicle 1.

The processor 110 may be further configured to change the notification depending on a contribution degree of the output of the machine learning model in the control decision or the control amount. The contribution degree may be given as an index, for example, a ratio of the machine learning model among the plurality of models configuring the planning unit 30 and the control amount calculation unit 40.

Figure 5A:
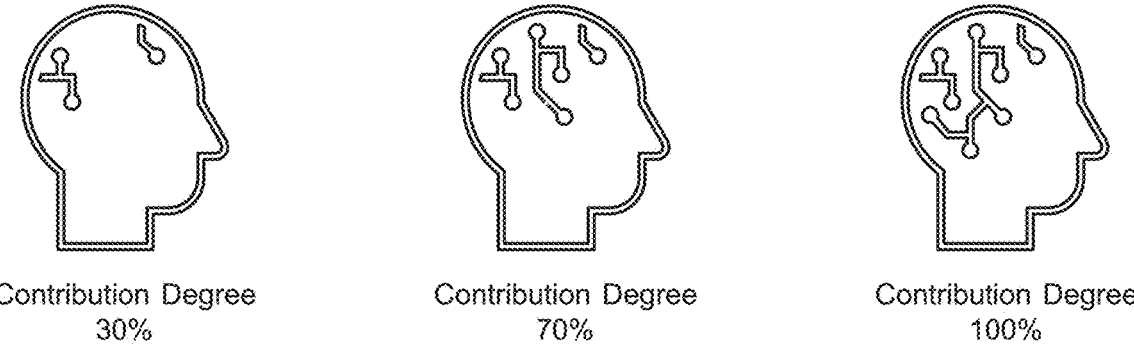
FIG. 5A is a diagram showing an example of changing notification depending on a contribution degree.
Figure 5B:
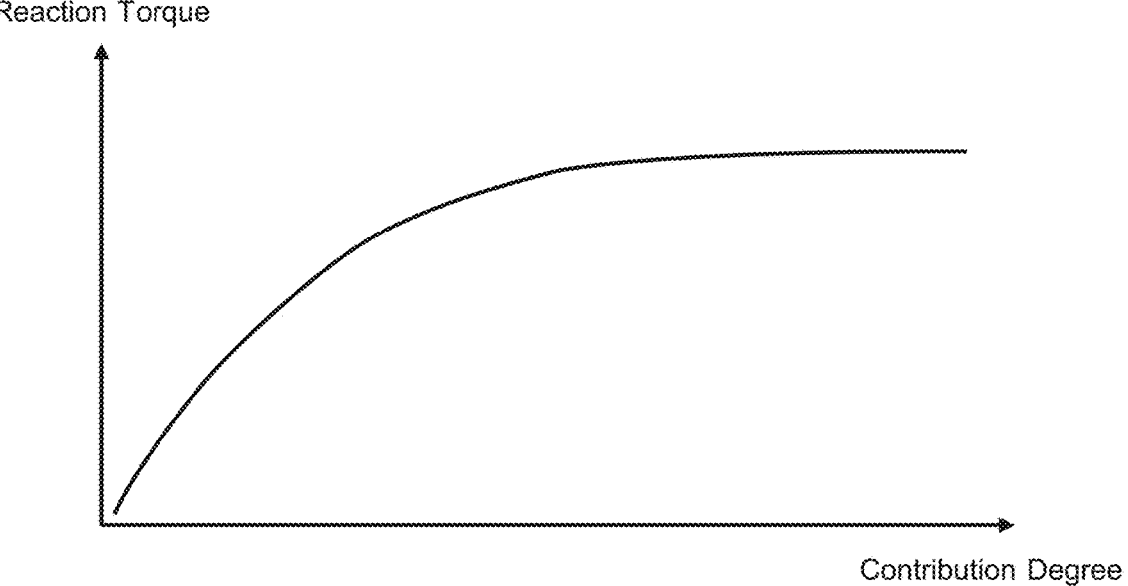
FIG. 5B is a diagram showing another example of changing notification depending on the contribution degree.

FIGS. 5A and 5B show an example of a case where the notification is changed depending on the contribution degree. FIG. 5A shows an example of a case where the display of the specific icon is changed depending on the contribution degree. FIG. 5B shows an example of a case where the reaction torque (the weight of the operation of the steering wheel 2) by the reaction torque actuator is changed depending on the contribution degree. In the example shown in FIG. 5B, the reaction torque increases as the contribution degree increases.

By adopting such configuration, the operator of the vehicle 1 can further recognize the approximate usage situation of the machine learning model in the automated driving function. This allows the operator of the vehicle 1 to make decisions based on the usage situation of the machine learning model.

2-3. Processing

Figure 6:
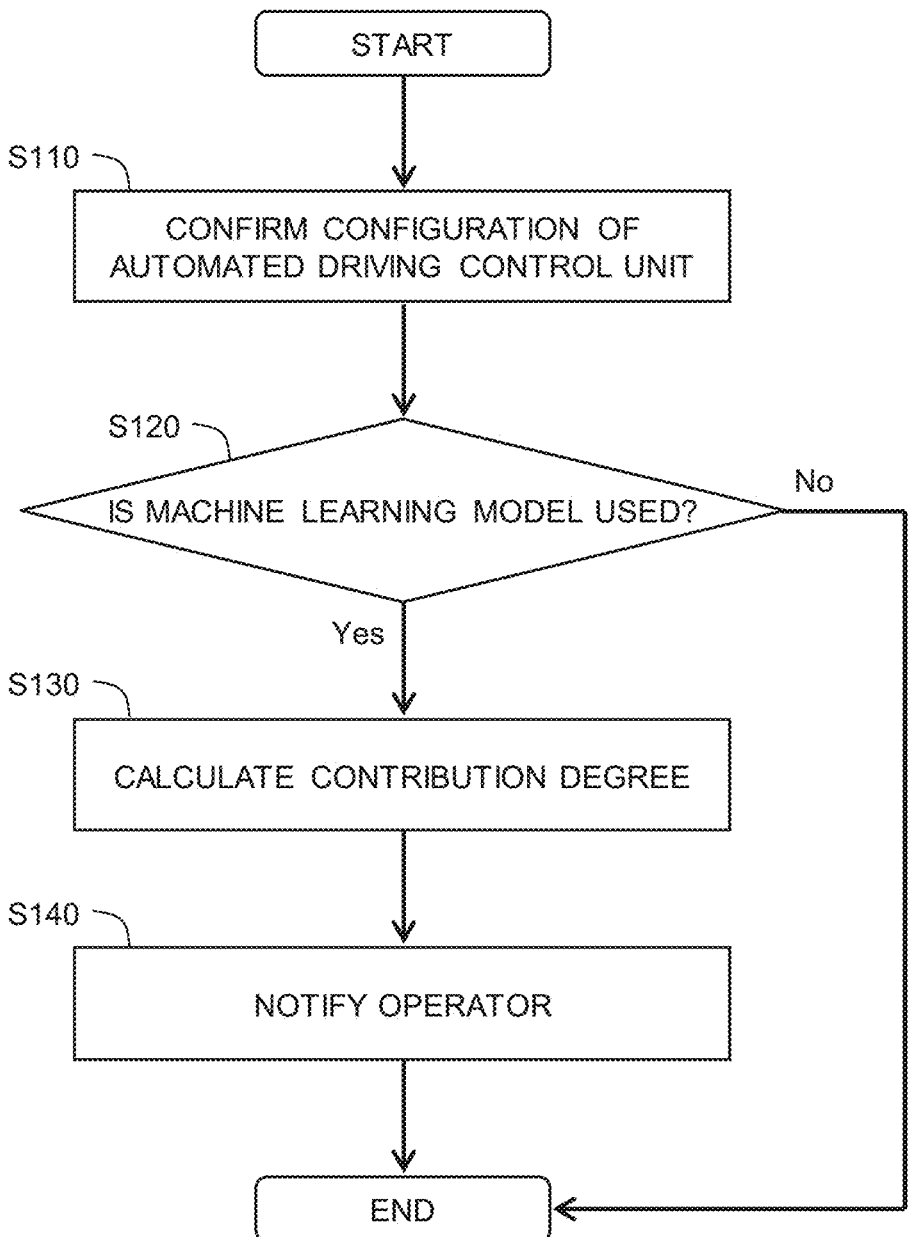
FIG. 6 is a flowchart showing an example of processing executed by a processor.

FIG. 6 is a flowchart showing an example of processing executed by the processor 110 regarding the notification to the operator of the vehicle 1. The process according to the flowchart shown in FIG. 6 is repeatedly executed at a predetermined processing cycle during the execution of the automated driving function, for example. Alternatively, the process may be executed when the model included in the recognition unit 20, the planning unit 30, or the control amount calculation unit 40 is switched.

In step S110, the processor 110 confirms the configuration of the automated driving control unit (the recognition unit 20, the planning unit 30, and the control amount calculation unit 40).

Next, in step S120 (first process), the processor 110 determines whether or not a machine learning model is used. When it is determined that the machine learning model is not used (step S120; No), the process ends without notifying the operator of the vehicle 1. When it is determined that the machine learning model is used (step S120; Yes), the process proceeds to step S130.

In step S130, the processor 110 calculates the contribution degree of the output of the machine learning model.

Next, in step S140 (second process), the processor 110 notifies the operator of the vehicle 1 depending on the contribution degree calculated in step S130. After step S140, the process ends.

3. Effect

As described above, according to the present embodiment, it is determined whether or not a machine learning model is used in the automated driving function being executed. When it is determined that the machine learning model is used, the operator of the vehicle 1 is notified that the automated driving function using the machine learning model is being executed. It is thus possible to reduce the erroneous recognition of the operator of the vehicle 1 as to whether or not the automated driving function using the machine learning model is used.

The present embodiment may also be applied to another control system installed in the vehicle 1. For example, other control systems for executing one or more control functions include a driving assistance system. The driving assistance system is a system that executes control functions such as automated emergency braking, cruise control, traffic sign recognition, and the like in response to a driving environment of the vehicle 1 or a request. When the present embodiment is applied to the driving assistance system, it is sufficient to determine whether or not the machine learning model is used in each control function being executed. Then, when it is determined that the machine learning model is used in any of the control functions being executed, the operator of the vehicle 1 may be notified that the control function using the machine learning model is being executed. At this time, the notification may be changed according to the type of the control function determined to use the machine learning model.

What is claimed is:

1. A control system installed in a vehicle, the control system comprising:

processing circuitry configured to execute one or more control functions in response to a driving environment of the vehicle or a request, wherein the processing circuitry is further configured to execute:

a first process of determining whether or not a machine learning model is used in a control function being executed;

when it is determined that the machine learning model is used, a second process of notifying an operator of the vehicle that the control function using the machine learning model is being executed; and operate the vehicle based on a control decision or a control amount generated using the machine learning model based on the driving environment of the vehicle recognized, wherein the notification is dependent on a contribution degree that is a ratio of the machine learning model among a plurality of models used in execution of the control function.

2. The control system according to claim 1, wherein the first process includes determining that the machine learning model is used when an output of the machine learning model is used as the control decision or the control amount in the control function being executed.

3. The control system according to claim 2, wherein the second process includes:

calculating a contribution degree of the output of the machine learning model to the control decision or the control amount; and changing a notification depending on the contribution degree.

4. The control system according to claim 1, wherein the first process includes determining that the machine learning model is used when, in the control function being executed, the control determination or calculation of the control amount is being performed using information of the driving environment recognized by the machine learning model.

* * * * *